United States Patent [19]

Lee

[11] 4,218,295

[45] Aug. 19, 1980

[54] EPOXY-CARBONYL COMPOSITIONS AS PHOTOPOLYMERIZATION INITIATORS

[75] Inventor: George A. Lee, Wayland, Mass.

[73] Assignee: The Dow Chemical Company, Midland, Mich.

[21] Appl. No.: 39,463

[22] Filed: May 16, 1979

[51] Int. Cl.$^2$ ............................ C08F 2/46; C08F 4/00
[52] U.S. Cl. .............................. 204/159.23; 204/159.14; 204/159.19; 428/418; 428/463
[58] Field of Search ...................... 204/159.23, 159.18; 96/115 P

[56] References Cited

U.S. PATENT DOCUMENTS

| | | | |
|---|---|---|---|
| 3,989,610 | 11/1976 | Tsukada et al. | 204/159.15 |
| 4,056,453 | 11/1977 | Barzynski et al. | 204/159.23 |
| 4,146,453 | 3/1979 | Via | 204/159.23 |

Primary Examiner—Richard B. Turer

[57] ABSTRACT

A photopolymerizable composition comprises: (1) a free radical polymerizable material, such as ethylenically unsaturated monomers and (2) a photoinitiator system of (a) a compound having an oxirane group in an alpha,beta-position to a carbonyl group, typical of which is 1-benzoyl-2-phenylethylene oxide and (b) a tertiary amine or other electron donor.

10 Claims, No Drawings

EPOXY-CARBONYL COMPOSITIONS AS PHOTOPOLYMERIZATION INITIATORS

BACKGROUND OF THE INVENTION

The photoinducement of the free radical polymerization of ethylenically unsaturated monomers is well known. Polymerization with light of the monomers alone proceeds at a very much slower rate than the polymerization brought about by the more widely used thermal induced catalysis using free radical generating catalysts. It has become common to employ photopolymerization initiators to increase the polymerization rate. Many classes of such initiators have been described in the literature, as, for example, the survey given by Oster and Yang, "Photopolymerization of Vinyl Monomers", *Chemical Reviews*, 68, No. 2, pages 125–151 (Mar. 25, 1968). To date, however, the speed of cure of certain monomer/resin systems is not sufficiently rapid to provide the highly desirable energy savings ascribed to this technology.

SUMMARY OF THE INVENTION

The present invention provides a photopolymerizable composition of an ethylenically unsaturated monomer and a two-component photoinitiator system of (a) a compound having a chromophore capable of absorbing light and also having an intramolecular oxirane group and (b) an electron donor. Preferred (a) compounds are those having an oxirane group in an alpha,beta-position to a carbonyl group. The monomer is rapidly polymerized upon exposure of the composition to ultraviolet light.

DESCRIPTION OF THE INVENTION

In accordance with the present invention, polymerization of vinyl monomers is accomplished by exposing an unsaturated monomer or mixture of monomers to light radiation in the presence of a photoinitiator comprising an epoxy/carbonyl compound and an electron donor.

The useful epoxy/carbonyl compound is selected from these wherein an oxirane group is in an alpha,beta-position to a carbonyl group. Included within the scope are those compounds having a structure falling within the formula:

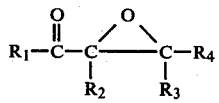

wherein $R_1$ is hydrogen, aliphatic hydrocarbyl or aryl and $R_2$, $R_3$ and $R_4$ are each hydrogen, aliphatic, aryl

wherein R is hydrogen, alkyl or aryl. Representative compounds are 1-benzoyl-2-phenylethylene oxide and 1,2-dibenzoylethylene oxide.

Such epoxy/carbonyl compounds are prepared by known methods of synthesis as, for example, by the method reported by S. Marmor, *J. Org. Chem.*, 28, 250 (1963). In that method, an alpha,beta-unsaturated ketone is stirred in pyridine while aqueous sodium hypochlorite is added. After a short reaction period, water is added and the precipitated product is collected by filtration. Recrystallization of the crude product from ethanol affords high yields of the epoxy ketone whose NMR spectra and melting points are in accord with the desired products described in the reference. Prepared in this manner, 1-benzoyl-2-phenylethylene oxide had a melting point of 90°–91° C. and 1,2-dibenzoylethylene oxide had a melting point of 126.5°–127.5° C.

The electron donor is a compound falling within the structure:

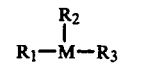

wherein M is an element of Group Va of the Periodic Table of the Elements, and the units, R, which may be the same or different, are hydrogen atoms, hydrocarbyl groups, substituted hydrocarbyl groups, aryl, aralkyl, alkaryl or groups in which two units, R, together with the element, M, form a cyclic ring system, no more than two of the units, R, being hydrogen atoms. At least one of the units, R, should have a —C—H group alpha to M.

The element, M, may be phosphorus, arsenic, antimony or preferably nitrogen.

One or more of the groups $R_1$, $R_2$ and $R_3$ may be a hydrocarbyl group, for example, an alkyl, cycloalkyl or alkaryl group. Preferably, at least one is an alkyl group which may, for example, contain from 1 to 10 carbon atoms.

Examples of suitable electron donors in which one or more of the groups $R_1$, $R_2$ and $R_3$ is a hydrocarbyl group include propylamine, n-butylamine, pentylamine, hexylamine, dimethylamine, diethylamine, dipropylamine, di-n-butylamine, dipentylamine, trimethylamine, triethylamine, tripropylamine, tri-n-butylamine, tripentylamine, dimethylaminoethyl methacrylate and long chain fatty amines, e.g., $C_{18}H_{37}NMe_2$. Examples of electron donors containing aromatic groups include N,N-dimethylaniline and N-methyl diphenylamine.

It is to be understood that throughout this specification where we refer to specific examples of suitable electron donors in which the element M is nitrogen, we also include corresponding specific examples in which the element M is phosphorus, arsenic or antimony. Thus, also included as useful compounds are dimethylphosphine, trimethylphosphine, tributylphosphine, dibutylphenylphosphine, methyldiphenylphosphine, methylbutylphenylarsine, trioctylarsine, dibutylphenylbismuthine, methylbutylphenylstibene and dibutylphenylstibene.

One or more of the units, R, may be a substituted hydrocarbyl group and, in particular, the hydrocarbyl group may carry a substituent having the structure:

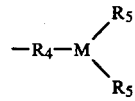

where M is an element of Group Vb of the Periodic Table of the Elements and the unit $R_4$ is, for example, an alkylene chain and the units $R_5$, which may be the same or different, are, for example, hydrogen atoms or hydrocarbyl groups.

Electron donors in which at least one of the units, R, is a substituted hydrocarbyl group include dialkylaminoalkanols, as, for example, dimethylaminoethanol or the di- and trialkanolamines, such as diethanolamine or triethanolamine.

Also included are diamines of the structure:

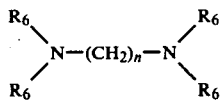

in which n is a whole number of at least two and the groups $R_6$, which may be the same or different, are hydrogen atoms or hydrocarbyl and especially alkyl groups. For example, the reducing agent may be ethylenediamine, trimethylenediamine, tetramethylenediamine, pentamethylenediamine, hexamethylenediamine or N-hydrocarbyl, especially N-alkyl derivatives thereof. Other suitable reducing agents include derivatives having the above structure in which one or more of the hydrogen atoms in the —$CH_2$ bridging unit carry a

group, especially a —$NH_2$ group.

Two or more of the units, R, together with the element M, may form a cyclic structure of the formula:

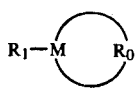

wherein $R_0$ is a composite of the units $R_2$ and $R_3$ as earlier defined. Examples of electron donors in which the element M forms part of a cyclic ring structure include piperidine and N-hydrocarbyl, especially N-alkyl derivatives of piperidine; also dipiperidinomethane, 1,3-(N-beta-hydroxyethyl-4-piperidyl)propane, 1,3-di-4-piperidylpropane, N-hydroxyethyl piperidine, 4-benzoylpyridine, N-ethylmorpholine and N-hydroxyethylmorpholine.

The free radical polymerizable material is suitably at least one monomer containing ethylenic unsaturation in a terminal group. For example, the ethylenically unsaturated material may be one or more monomers selected from vinyl monomers, allyl monomers and vinylidene monomers or may be an ethylenically unsaturated prepolymer, oligomer or polymer. Typical of the monomers are the acrylate and methacrylate esters of monohydric alcohols or dihydric alcohols such as methyl acrylate, butyl methacrylate, octyl acrylate, ethylene glycol dimethacrylate, triethylene glycol dimethacrylate, pentaerythritol diacrylate, dipentaerythritol triacrylate, pentaerythritol tetraacrylate, trimethylol propane triacrylate, 1,4-butylene diacrylate and similar esters. Also included are the like esters of crotonic and cinnamic acids.

Also useful are the esters of dicarboxylic acids such as those of itaconic, maleic fumaric, aconitic and like acids.

Also contemplated as useful comonomers may be acrylonitrile and methacrylonitrile; as well as acrylamide, methacrylamide, ethacrylamide, ethylenebisacrylamide, N-tert-butylacrylamide and the like.

Various monoalkenyl aromatic hydrocarbons of the benzene series may be suitable comonomers for the presently intended purpose and such monomers are characterized by the general formula:

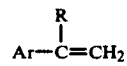

wherein Ar, selected independently, represents an aromatic hydrocarbon and a nuclear halohydrocarbon radical and R is hydrogen, a $C_1$-$C_4$ alkyl radical, or a halogen radical having an atomic number of from 17 to 35, including styrene, α-methylstyrene, o-methylstyrene, p-methylstyrene, m-methylstyrene, ar-ethylstyrene, propylstyrene, butylstyrene, ar-chlorostyrene, ar-bromostyrene and the like. Other monomeric ethylenically unsaturated compounds contemplated as comonomers for present purposes can be open chain aliphatic conjugated dienes having from 4 to 9 carbon atoms, such as butadiene, isoprene and the like; as well as vinyl ester monomers including vinyl acetate, vinyl propionate, vinyl butyrate, and the like, and vinylidene chloride.

The ethylenically unsaturated material may include at least one ethylenically unsaturated polymer, suitably in combination with at least one ethylenically unsaturated monomer. For example, the ethylenically unsaturated polymer may be an ethylenically unsaturated polyester formed by condensation of at least one ethylenically unsaturated polycarboxylic acid or anhydride, optionally, in combination with at least one saturated polycarboxylic acid or anhydride, with at least one polyol.

The polymerizable material may also be one of the vinyl ester resins which are the reaction products of about equivalent amounts of a polyepoxide and an unsaturated monocarboxylic acid.

Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete et al. also describe in U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan and the like, may be utilized in place of the dicarboxylic acid. All of the above-described resins contain the characteristic linkages:

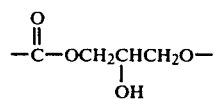

and terminal, polymerizable vinylidene groups, are classified as vinyl ester resins and are incorporated herein by reference.

Such vinyl ester resins are commonly blended with an unsaturated monomer to reduce the viscosity thereof. Commonly, the alkyl acrylates are employed as such reactive diluents in photopolymerization procedures. Vinyl aromatic monomers, such as styrene, are generally not suitable in such photoinduced reactions. Judicious selection of a desirable diluent can be made by reference to the literature.

The ethylenically unsaturated monomer may be, or may include, a polyfunctional monomer, polymerization of which will lead to the production of cross-linked materials. Suitable polyfunctional ethylenically unsaturated monomers include, for example, divinylbenzene, glycol dimethacrylate and a reaction product of a hydroxyalkyl acrylate or methacrylate with an isocyanate-ended adduct of a diol and a diisocyanate, for example, a reaction product of hydroxyethyl methacrylate and an isocyanate-ended adduct of 4,4'-diphenylmethane diisocyanate and oxypropylated bisphenol-A.

Where the ethylenically unsaturated material is a solid then it may be convenient, in order to produce a liquid composition, to include a suitable diluent in the composition. The diluent should, of course, have little or no inhibiting effect on polymerization of the ethylenically unsaturated material in the composition.

The concentration of the epoxy/carbonyl compound in the photopolymerizable composition is not critical. By way of example, concentrations in the range of 0.001 to 10 percent are usually satisfactory, although concentrations outside this range may be used, if desired. Normally, the compound will be present in a concentration of from 0.1 to 7 percent, and preferably, from 0.5 to 5 percent by weight of the polymerizable ethylenically unsaturated material in the composition.

Suitably, the concentration of the electron donor may be in the ranges hereinbefore described in respect to the photoinitiator although concentrations outside these ranges may be used if desired. Preferably, the reducing agent is present in a concentration of from 1 to 5 percent by weight of the ethylenically unsaturated material in the photopolymerizable composition.

The photoinitiator and the electron donor desirably should be soluble in the ethylenically unsaturated material at least to an extent sufficient to give the desired concentration therein. Although polymerization will proceed if the photoinitiator and electron donor are not completely dissolved, it is much preferred that the photoinitiator and the electron donor are together completely soluble in the ethylenically unsaturated material to the desired extent where the photoinitiator or electron donor is not sufficiently soluble in the ethylenically unsaturated material, or where one or the other may be dissolved only with difficulty, it has been found that dissolution may be assisted by addition to the ethylenically unsaturated material of a small amount of a diluent in which the photoinitiator or electron donor is soluble and which is miscible with the ethylenically unsaturated material. Suitably, the photoinitiator or electron donor may be introduced into the ethylenically unsaturated material in the form of a solution in such a diluent.

The epoxy/carbonyl and electron donor may be dissolved in the same batch of a suitable diluent and then added to the ethylenically unsaturated material. Alternatively, the epoxy/carbonyl and electron donor may be dissolved in different batches of the same or different diluents and added to the ethylenically unsaturated material. The method of addition, the diluent or diluents and the amounts thereof to be used will readily be determined by a skilled man. In general, the minimum amount of diluent(s) will be used.

In general, polymerization of the ethylenically unsaturated material proceeds readily at ambient temperatures when the composition is irradiated with radiation having a wave length which converts the epoxy/carbonyl to an excited state. However, the rate of polymerization often may be increased by effecting the polymerization at a temperature above room temperature.

The increased photopolymerization efficiency of these systems permits substantial energy savings in the curing process and also enables lower concentrations of the photoinitiator to be used. Also, the systems seem to convey a high degree of through cure so that nearly all of the double bonds are consumed.

The compositions of the invention are suitable for the production of shaped articles of polymeric materials, for example, sheets, and are particularly suitable for use in the preparation of polymeric materials in the form of films and in particular paint films. Thus, as the compositions of our invention are substantially stable such that little or no polymerization of the ethylenically unsaturated material takes place in the absence of radiation, they form thermally stable compositions which may be formed into a film, e.g., a paint film, and then caused or allowed to polymerize by exposure to light, e.g., by exposing the film to natural light. When formed into a film and exposed to light, the compositions rapidly polymerize.

The compositions of the invention, especially compositions which are to be used in the production of cross-linked materials, especially paint films, may contain pigments, which may be organic or inorganic.

Where the composition contains a pigment, a photosensitizer should be chosen which is excited by radiation having a wave length which is not absorbed to an excessive extent by the pigment present in the composition. Preferably, the pigment should be transparent to radiation at the wave length which excites the photosensitizer. Where the pigment absorbs ultraviolet radiation but absorbs little or no radiation in the visible region of the spectrum, those photosensitizers in the compositions of the invention which are excited by visible light, for example, N,N'-oxalyl indigo, are especially useful.

Other additives may be present in the photopolymerizable compositions, e.g., antioxidants and stabilizers.

The invention is now illustrated by the following examples in which all parts are expressed as parts by weight.

EXAMPLE 1

A blend was made from 94.7 parts of a 1 to 1 mixture of 2-ethylhexyl acrylate and the diacrylate of the diglycidyl ether of bisphenol A; 2.9 parts methyldiethanolamine and 2.4 parts of 1,2-dibenzoylethylene oxide.

Other similar compositions were prepared replacing the 1,2-dibenzoylethylene oxide with other known photoinitiators and with 1-benzoyl-2-phenylethylene oxide.

The compositions were spread onto Bonderite 37 treated steel panels with a No. 7 wound wire Meyer rod. The coated panels were exposed to a 200 watt/linear inch Hanovia mercury arc lamp using a conveyor belt moving at 100 feet per minute. The number of such passes required to develop a tack-free surface was determined. The results are listed in the following Table I.

TABLE I

| Photoinitiator (Wt. %) | Number of Passes to Cure |
| --- | --- |
| Acetophenone (3.1) | >30 |
| Benzophenone (2.7) | 10/11 |
| Diethoxyacetophenone (3.2) | 5/6 |
| i-Butylbenzoin ether (3.5) | 8/9 |
| 1-Benzoyl-2-phenylethylene oxide (2.7) | 15 |
| 1,2-Dibenzoylethylene oxide (2.4) | 4 |

EXAMPLE 2

Compositions were prepared from 1,6-hexanediol diacrylate and 3.2 percent methyl diethanolamine and varying amounts of various photoinitiators. The compositions were spread in a thickness of 0.015 millimeter between sodium chloride plates. The samples were irradiated with an 8 watt mercury lamp whose principal emission was at 3000 Angstroms. The time of cure was determined by infrared analysis of the polymerizing acrylate double bond.

The results are shown in Table II.

TABLE II

| Photoinitiator (Wt. %) | Total Time for Cure (Secs.) |
| --- | --- |
| Acetophenone (3.2) | 196 |
| Diethoxyacetophenone (3.1) | 36 |
| i-Butylbenzoin ether (3.2) | 40 |
| 1-Benzoyl-2-phenylethylene oxide (2.8) | 55 |
| 1,2-Dibenzoylethylene oxide (2.3) | 27 |

What is claimed is:

1. A photopolymerizable composition consisting essentially of (1) a free radical polymerizable ethylenically unsaturated compound and (2) a photoinitiator system comprising (a) an effective amount of a photoinitiator of the formula:

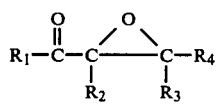

wherein $R_1$ is hydrogen, aliphatic hydrocarbyl or aryl and $R_2$, $R_3$ and $R_4$ are independently hydrogen, aliphatic, aryl or

wherein $R_5$ is hydrogen, alkyl or aryl and (b) an effective amount of an electron donor compound.

2. The composition claimed in claim 1 wherein said photoinitiator is present in a concentration of from 0.001 percent to 10 percent by weight of the free radical polymerizable material.

3. The composition claimed in claim 2 wherein the epoxy/carbonyl compound is present in a concentration of from 1 to 3 percent and said electron donor in a concentration of from 1.5 to 5 percent, all percentages by weight of the total composition.

4. The composition claimed in claim 1 wherein said electron donor is a compound having the formula:

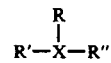

wherein X is an element of Group Va and R, R' and R'' is each alkyl, hydroxyalkyl, aryl, aralkyl or alkaryl and one or both of R and R'' may be hydrogen.

5. The composition claimed in claim 4 wherein said electron donor is methyldiethanolamine.

6. The composition claimed in claim 1 wherein said electron donor is a compound having the formula:

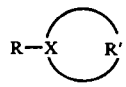

wherein X is an element of Group Va and R is hydrogen, alkyl, hydroxyalkyl, aryl, aralkyl or alkaryl and R' together with X is a cycloaliphatic ring or aryl ring of 4 to 5 carbon atoms.

7. The composition claimed in claim 1 wherein said compound (a) is 1,2-dibenzoylethylene oxide.

8. The composition claimed in claim 1 wherein said compound (a) is 1-benzoyl-2-phenylethylene oxide.

9. The composition claimed in claim 1 wherein said free radical polymerizable material comprises at least one monomer having terminal ethylenic unsaturation.

10. A process for the preparation of a polymeric material which comprises irradiating the composition of claim 1 with actinic radiation having a frequency which is capable of exciting the photoinitiator to an excited state.

* * * * *